United States Patent
Chiu et al.

(10) Patent No.: US 7,459,876 B2
(45) Date of Patent: Dec. 2, 2008

(54) MOTORS AND CONTROL METHODS THEREOF

(75) Inventors: Magellan Chiu, Taoyuan Hsien (TW); Venson Kuo, Taoyuan Hsien (TW); Wen-Shi Huang, Taoyuan Hsien (TW); Ming-Shi Tsai, Taoyuan Hsien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 365 days.

(21) Appl. No.: 11/014,827

(22) Filed: Dec. 20, 2004

(65) Prior Publication Data

US 2005/0194849 A1  Sep. 8, 2005

(30) Foreign Application Priority Data

Mar. 5, 2004   (TW) .............................. 93105824 A

(51) Int. Cl.
   *H02P 6/20* (2006.01)
(52) U.S. Cl. ............. 318/702; 318/400.21; 318/400.41; 318/430
(58) Field of Classification Search ................ 318/138, 318/254, 430–434, 439, 720–724, 700, 400.01, 318/400.21, 400.37, 400.38, 400.41, 702; 388/903
   See application file for complete search history.

(56) References Cited

U.S. PATENT DOCUMENTS

| | | | | |
|---|---|---|---|---|
| 3,679,954 A | * | 7/1972 | Hedrick | 318/254 |
| 3,743,902 A | * | 7/1973 | Perkins et al. | 318/138 |
| 3,757,183 A | * | 9/1973 | Nola | 318/254 |
| 3,767,986 A | * | 10/1973 | Wada | 318/138 |
| 3,775,648 A | * | 11/1973 | Brown et al. | 318/138 |
| 3,783,359 A | * | 1/1974 | Malkiel | 318/254 |
| 3,881,142 A | * | 4/1975 | Endo et al. | 318/138 |
| 3,898,544 A | * | 8/1975 | Tanikoshi | 318/254 |
| 3,942,083 A | * | 3/1976 | Takahashi et al. | 318/138 |
| 3,988,652 A | * | 10/1976 | Endo et al. | 318/138 |
| 4,114,073 A | * | 9/1978 | Uzuka | 318/138 |
| 4,135,120 A | * | 1/1979 | Hoshimi et al. | 318/138 |
| 4,344,023 A | * | 8/1982 | Yokobori et al. | 318/254 |
| 4,376,261 A | * | 3/1983 | von der Heide et al. | 318/254 |
| 4,435,673 A | * | 3/1984 | Hagino et al. | 318/254 |
| 4,479,078 A | * | 10/1984 | Kidd et al. | 318/254 |
| 4,491,770 A | * | 1/1985 | Gotou | 318/254 |
| 4,535,276 A | * | 8/1985 | Yokobori | 318/400.04 |
| 4,554,491 A | * | 11/1985 | Plunkett | 318/254 |

(Continued)

FOREIGN PATENT DOCUMENTS

JP   56-091668 A   7/1981

(Continued)

*Primary Examiner*—Bentsu Ro
(74) *Attorney, Agent, or Firm*—Birch, Stewart, Kolasch & Birch, LLP

(57) ABSTRACT

Motors comprising stators and rotors having a plurality of north poles and south poles and methods of controlling the same. A first sensor and a second sensor are provided. The first and second sensors are disposed on the stator in a manner that the first and second sensors never simultaneously detect boundaries between the north and south poles during rotation of the rotor. If any one of the first and second sensors continuously detects a north pole or a south pole for a predetermined duration, the motor is shut off.

16 Claims, 7 Drawing Sheets

U.S. PATENT DOCUMENTS

| | | | | |
|---|---|---|---|---|
| 4,563,622 | A * | 1/1986 | Deavers et al. | 318/254 |
| 4,623,826 | A * | 11/1986 | Benjamin et al. | 318/254 |
| 4,654,567 | A * | 3/1987 | Bracha | 318/400.21 |
| 4,665,350 | A * | 5/1987 | Angi et al. | 318/254 |
| 4,701,683 | A * | 10/1987 | Kikkawa | 318/254 |
| 5,206,567 | A * | 4/1993 | Sakurai et al. | 318/400.34 |
| 5,838,127 | A * | 11/1998 | Young et al. | 318/293 |
| 5,872,434 | A * | 2/1999 | Hill | 318/159 |
| 6,239,564 | B1 * | 5/2001 | Boe et al. | 318/254 |
| 6,271,638 | B1 * | 8/2001 | Erdman et al. | 318/400.01 |
| 6,640,417 | B2 * | 11/2003 | Leitz et al. | 29/596 |
| 6,806,664 | B2 * | 10/2004 | Beishline | 318/280 |
| 6,982,534 | B2 * | 1/2006 | Hahn et al. | 318/434 |
| 2003/0227271 | A1 * | 12/2003 | Shindo | 318/439 |
| 2004/0061470 | A1 * | 4/2004 | Ito et al. | 318/565 |

FOREIGN PATENT DOCUMENTS

| | | |
|---|---|---|
| JP | 62-071488 A | 4/1987 |
| JP | 07-123771 A | 5/1995 |

* cited by examiner ized by the sensor 16 and the clockwise rotation resumes. Such repeated clockwise and counterclockwise rotations cause the rotor 12 to shake. The output signal $S_{abnom}$ generated when the sensor 16 shakes is shown in FIG. 3b. The shake of rotor 12 can cause motor damage due to current overload.

MOTORS AND CONTROL METHODS THEREOF

BACKGROUND

The present invention relates to a control method and, more particularly, to a control method capable of preventing a motor from damage.

As shown in FIG. 1, a conventional motor comprises a stator 10 and a rotor 12. A sensor 16 is disposed on the stator 10, and four north poles (hereinafter N pole) and four south poles (hereinafter S pole) are alternatively on the rotor 12. When the sensor 16 detects an N pole or an S pole of the rotor 12, current direction in the stator coil (not shown) is changed to change the polarity of the iron core of the stator 10. When an N pole 121 is detected by the sensor 16, a high level signal is output and the polarity of iron core 101 of the stator 10 is changed to north. Thereby, rotation of the rotor 12 is maintained by the repulsion between the N pole 121 and the iron core 101. When an S pole is detected by the sensor 16, a low level signal is output and the polarity of iron core 101 is changed to south, thereby maintaining the rotation of the rotor 12. The output signal $S_{nom}$ of the sensor 16 is represented in FIG. 3a.

If the boundary between the N pole 121 and an S pole 122 is positioned near the senor 16 when the rotor 12 stops, the sensor 16 detects the N pole 121 first and the polarity of the iron core 101 is changed to north and the rotor 12 rotates clockwise when the motor restarts. As shown in FIG. 2, the rotor 12 rotates continuously. When the S pole 122 is detected by the sensor 16, the polarity of the iron core 101 is changed to south. Thereby, the rotor 122 is rotated counterclockwise by the repulsion between the S pole 122 of the rotor 12 and the iron core 101. In turn, the N pole 121 is again detected by the sensor 16 and the clockwise rotation resumes. Such repeated clockwise and counterclockwise rotations cause the rotor 12 to shake. The output signal $S_{abnom}$ generated when the sensor 16 shakes is shown in FIG. 3b. The shake of rotor 12 can cause motor damage due to current overload.

The number of boundaries between the N and S poles depends on the number of the N poles or S poles. In FIGS. 1 and 2, the rotor 12 is provided with 8 poles (including N and S poles), therefore 8 boundaries are provided. The number of boundaries of a rotor has direct effect on the amount of shaking.

SUMMARY

Motors and control methods thereof are provided. An exemplary embodiment of a motor comprises a stator and a rotor. The rotor has a plurality of north poles and south poles alternatively arranged in a circle. An exemplary embodiment of a method for motor control comprises: providing a first sensor and a second sensor on the stator in a manner that prevents the first and second sensors from simultaneously detecting boundaries between the north and south poles during rotation of the rotor; determining a first duration; sending out a first signal when the first sensor detects any one of the north poles during the rotation of the rotor and a second signal when the first sensor detects any one of the south poles; sending out a third signal when the second sensor detects any one of the north poles during the rotation of the rotor, and a fourth signal when the second sensor detects any one of the south poles; and shutting off the motor if the first, second, third or fourth signals are continuously transmitted longer than the first duration.

Some embodiments of a motor comprise a rotor, a stator, a first sensor, a second sensor and a processor. The rotor has a plurality of north poles and south poles, the first sensor is disposed on the stator, and the second sensor is disposed on the stator and separated from the first sensor by an appropriate distance. The processor receives signals from the first and second sensors. The first sensor and the second sensor are disposed on the stator in a manner that the first and second sensors never simultaneously detect boundaries between the north and south poles during rotation of the rotor.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus axe not limitative of the present invention, and wherein.

DETAILED DESCRIPTION

Figure 1:
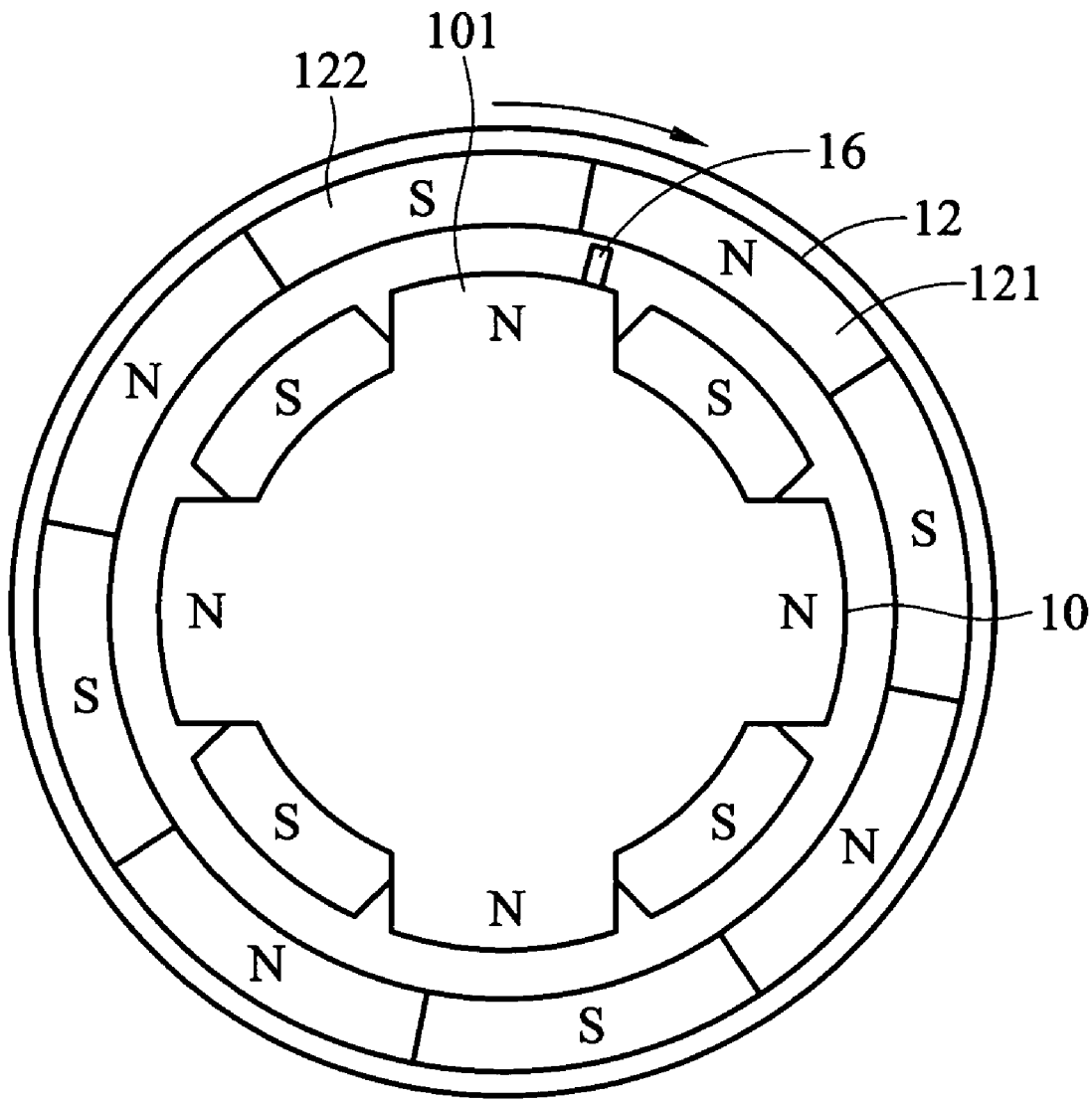
FIG. 1 is schematic view of a conventional motor during clockwise rotation.
Figure 2:
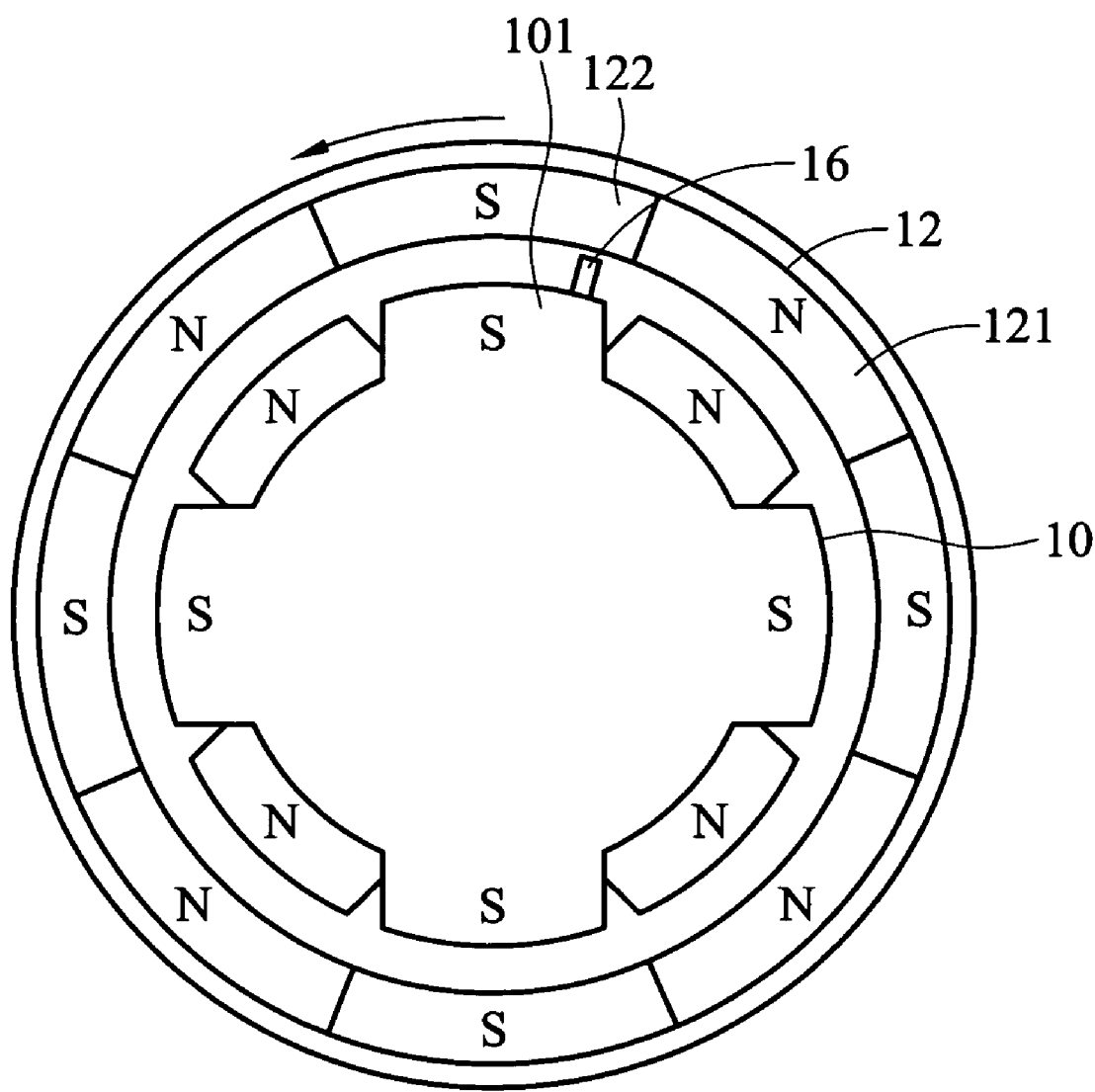
FIG. 2 is a schematic view of a conventional motor during counterclockwise rotation.
Figure 3A:
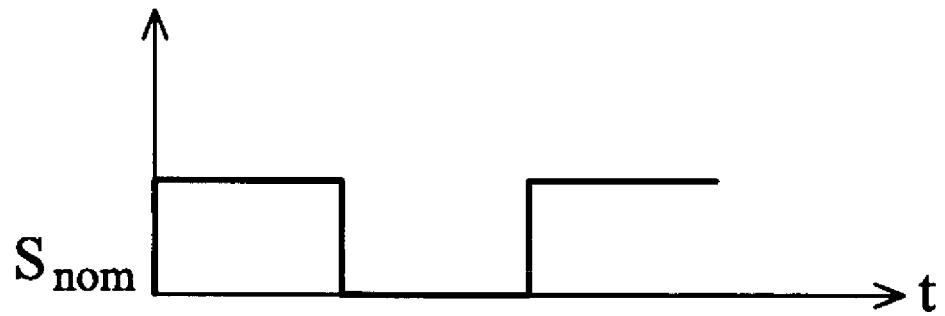
FIG. 3a is a signal diagram of a sensor representing a conventional motor in a normal condition.
Figure 3B:
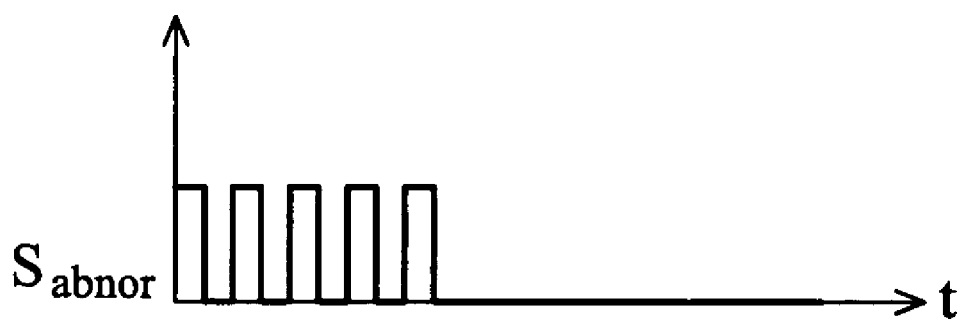
FIG. 3b is a signal diagram of a sensor representing a conventional motor in an abnormal condition.
Figure 4:
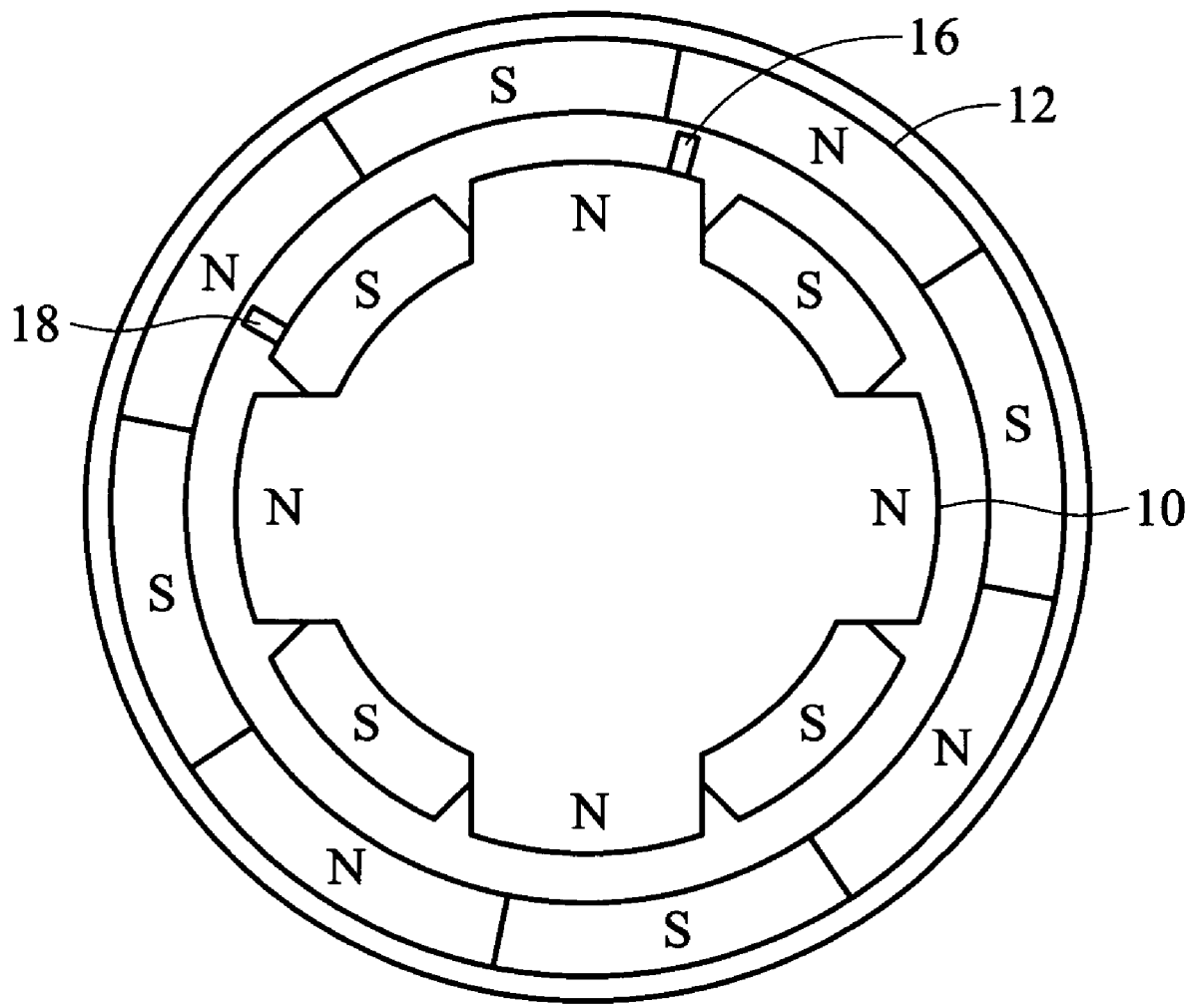
FIG. 4 is a schematic view of an embodiment of a motor.

Motors and control methods thereof will be discussed in detail in the following. FIG. 4 is a schematic view of an embodiment of a motor, The motor comprises a rotor 12 and a stator 10. The rotor 12 has a plurality of north poles and south poles (8 poles are provided in this embodiment). Sensors 16 and 18 are disposed on the periphery of the stator 10. For the motor shown in FIG. 4, the sensor 18 and the sensor 16 can detect boundaries between a north pole and a south pole (hereinafter referred to as an N-S boundary) in S positions simultaneously (8 N-S boundaries in the rotor 12). If the sensor 18 is never positioned at any one of the 8 positions, the sensors 16 and 18 never simultaneously detect the N-S boundary.

In some embodiments, the sensors 16 and 18 are magnetic field sensors, such as a shunt, a current transformer, a Hall sensor or a magnetic resistor.

Figure 5:
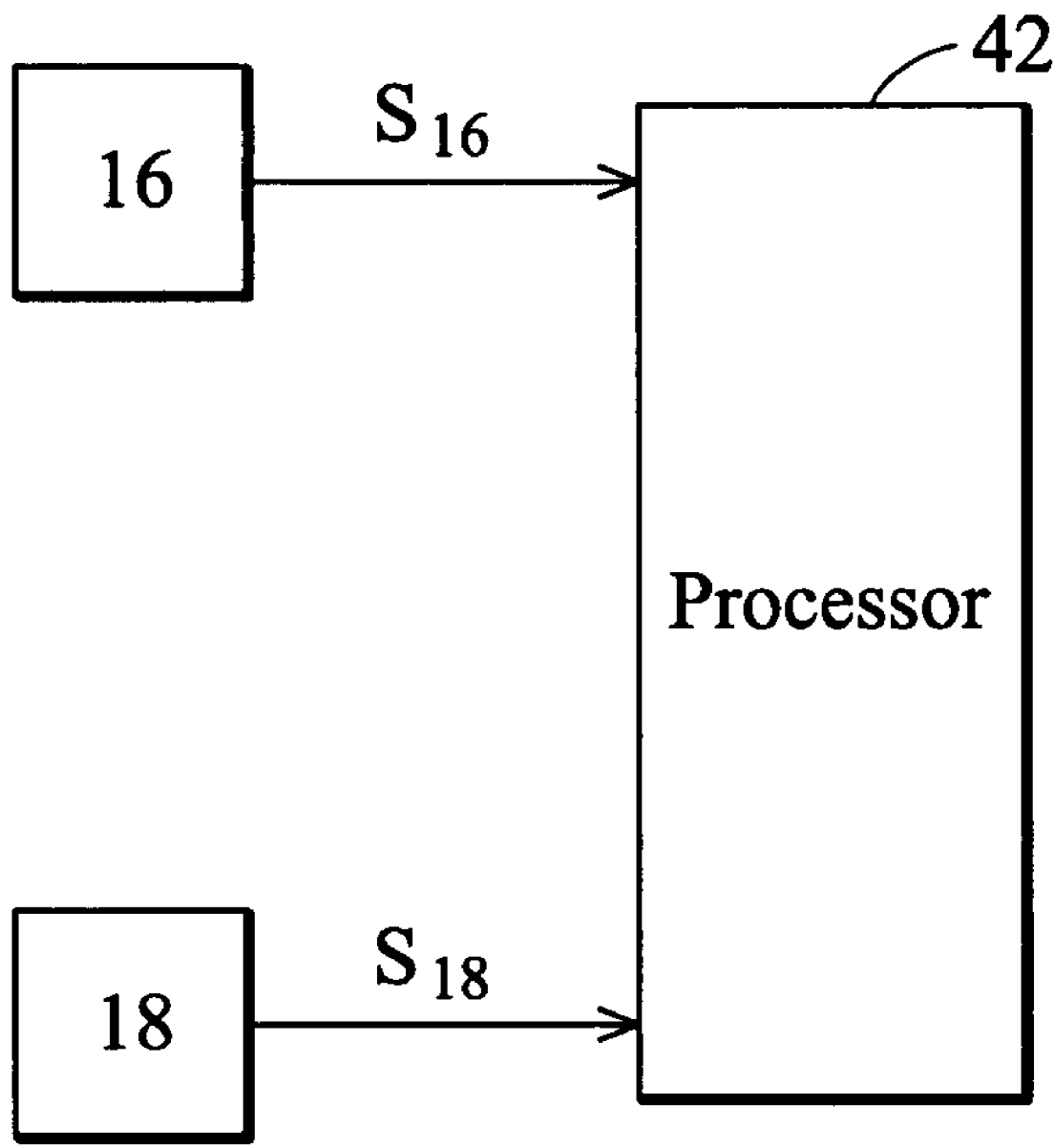
FIG. 5 is a block diagram showing a control method of an embodiment of a motor.

FIG. 5 is a block diagram showing an embodiment of a method for controlling a motor. In FIG. 5, output signals $S_{16}$, $S_{18}$ from the sensors 16, 18, respectively, are input to a processor 42. The output signal $S_{16}$ of the sensor 16 is referred to as a first signal (high level) when it detects an N pole and referred to as a second signal (low level) when it detects an S pole. The output signal $S_{18}$ of the sensor 18 is referred to as a third signal (high level) when it detects an N pole and referred to as a fourth signal (low level) when it detects an S pole.

Referring to FIG. 4, when the motor starts and the N-S boundary of the rotor 12 is located near the sensor 16, an N pole and an S pole are alternately detected by the sensor 16 so that the polarity of the stator 10 is alternately changed, at which time the first signal and the second signal are alternately output by the sensor 16 (first sensor). The sensor 18 (second sensor), however, always detects the N pole at this time so that the output signal of the sensor 18 is maintained at high level for a predetermined duration (and continuously sent out longer than a predetermined duration).

When the output signal of the sensor 16 is alternately changed and the output signal of the sensor 18 is maintained at high level over the predetermined duration, the processor 42 outputs an enable signal to shut off the motor, thereby avoiding damage due to current overload.

Figure 6A:
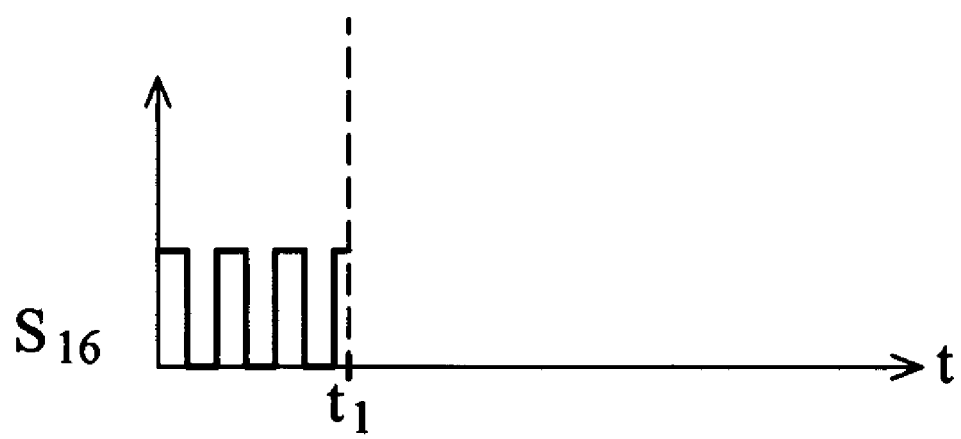
FIG. 6a depicts an output signal of the sensor of an embodiment of a motor.
Figure 6B:
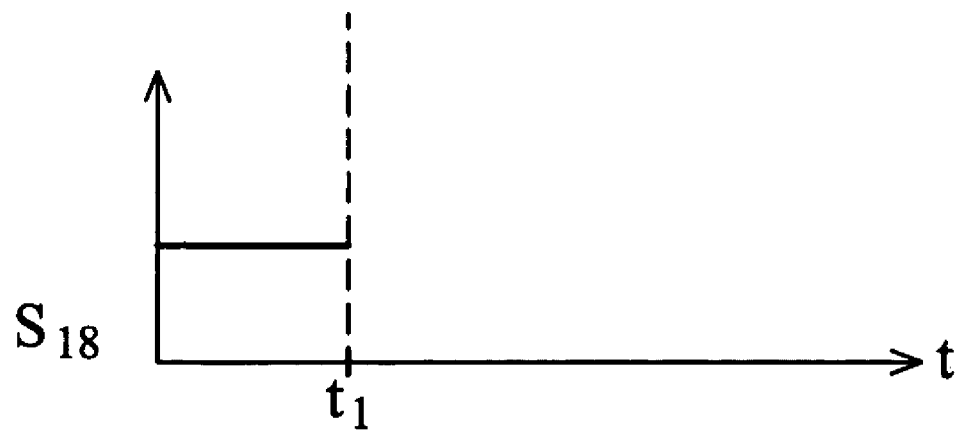
FIG. 6b depicts output signal of another sensor of an embodiment of a motor.

FIGS. 6a, and 6b are wave diagrams of sensors 16 and 18 when the rotor shakes. When the motor starts, and the sensor 16 detects the N-S boundary of the rotor 12, $S_{16}$ is alternately changed and $S_{18}$ is maintained at high level. At this time, the processor 42 receives the output signals and outputs an enable signal to stop the motor. As long as neither of the output signals is maintained at high level over the predetermined duration, the sensor can accurately detect the polarity of the rotor.

The predetermined duration depends on the rotational speed of the motor. The faster the rotational speed of the motor, the shorter the predetermined duration $t_1$. The processor 42, such as a micro controller unit (MCU), controls the motor according to the output signals.

Figure 7:
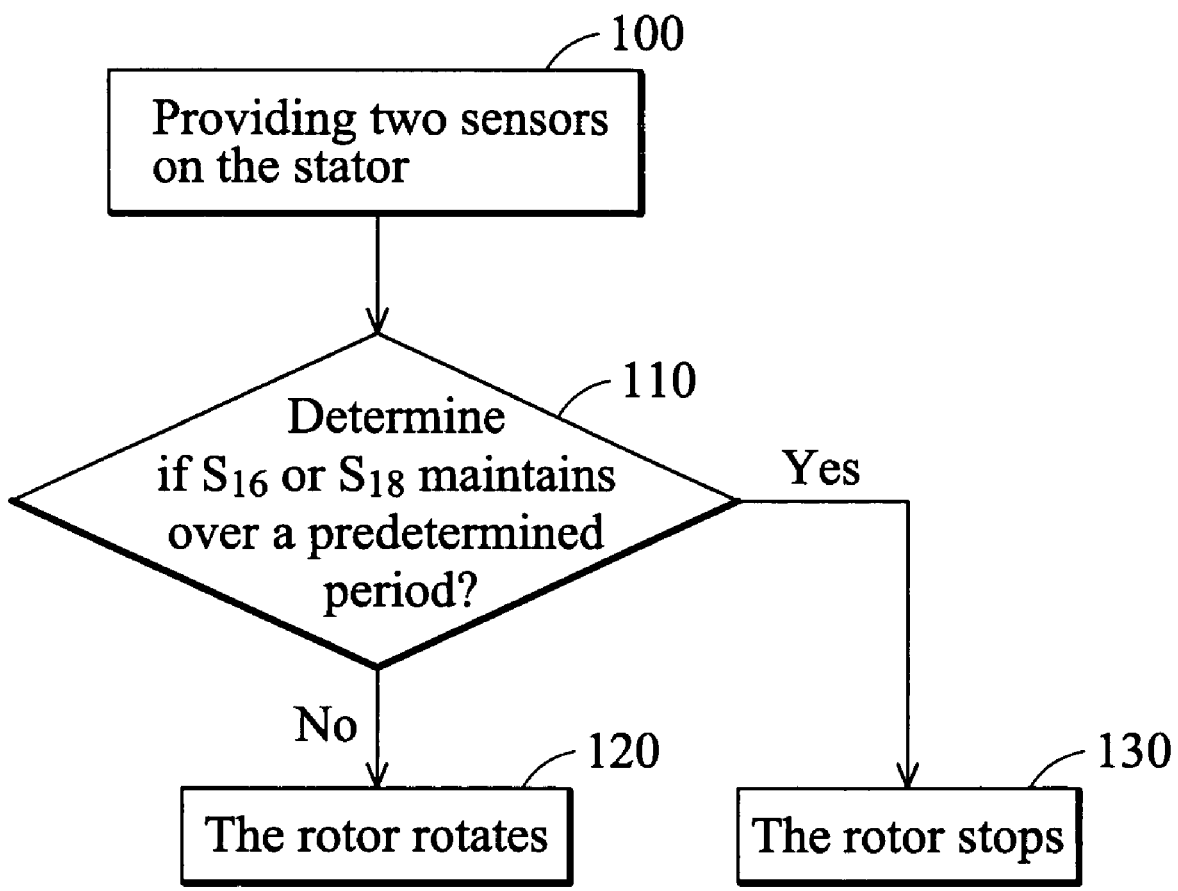
FIG. 7 is a flow chart of an embodiment of a method of controlling a motor.

FIG. 7 is the flow chart of the method of controlling a motor. An embodiment of the motor comprises a stator and a rotor having a plurality of N poles and S poles. An embodiment of a control method comprises the following steps.

In step 100: when the rotor 12 stops, the two provided sensors 16 and 18 on the stator 10 do not detect the N-S boundary simultaneously and step 110 is then executed.

In step 110: The first, second, third or fourth signals are detected.

If any one of the first, second, third and fourth signals is maintained at high level or low level for a predetermined period $t_1$ when the motor starts, and signals from the other sensor is alternative, step 130 is executed; otherwise step 120 is executed.

Referring to FIG. 4, when the motor starts and the N-S boundary of the rotor 12 is detected by the sensor 16, the sensor 16 outputs a jitter signal, and the sensor 18 always detects an N pole and outputs a high level signal for a predetermined period $t_1$.

In step 120: rotation of the motor is maintained.

If the N-S boundary of the rotor 12 is never positioned near the sensor 16 when the motor starts, the sensor 16 can correctly detect the N pole or the S pole of the rotor 12. The processor 42 changes the polarity of the stator 10 correctly to rotate the rotor 12 continuously.

In step 130: the motor is shut off.

When the processor 42 receives a high level or a low level signal from one of the sensors 16 or 18 for a predetermined duration $t_1$, the motor is shut off to prevent damage due to current overload.

Two sensors are disposed on the stator of the motor of the invention, and the two sensors never detect the N-S boundary of the rotor at the same time. If one of the sensors detects the N-S boundary of the rotor when the motor starts, it is indicative that the rotor is shaking and cannot rotate normally. In this condition, the output signal of the other sensor is maintained at a high or low level for a predetermined duration. Thus, the motor is shut off to prevent damage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for preventing shake of a motor, the motor comprising a stator and a rotor, the rotor having a plurality of north poles and south poles, the control method comprising the steps of:
    providing a first sensor and a second sensor on the stator in a manner that the first and second sensors are disposed in such a manner that the first and second sensors never simultaneously detect boundaries between the north and south poles during rotation of the rotor, wherein only the first and second sensors are disposed on the stator;
    outputting first signal when the first sensor detects any one of the north poles during the rotation of the rotor and a second signal when the first sensor detects any one of the south poles;
    outputting a third signal when the second sensor detects any one of the north poles during rotation of the rotor, and a fourth signal when the second sensor detects any one of the south poles; and
    shutting off the motor when the first signal and the second signal are alternately output by the first sensor, and the third signal or the fourth signal is continuously sent out longer than a predetermined duration.

2. The control method as claimed in claim 1, wherein the predetermined duration is determined by a revolution speed of the rotor.

3. The control method as claimed in claim 1, wherein the first and second sensors are magnetic field sensors.

4. The control method as claimed in claim 3, wherein the magnetic field sensor is a shunt, a current transformer, or a Hall sensor.

5. The method as claimed in claim 3, wherein the first and second sensors are magnetic resistors.

6. The control method as claimed in claim 1 further comprising a step of:
    outputting an enable signal to the motor before shutting off the motor.

7. The control method as claimed in claim 6, wherein the enable signal is generated by a processor.

8. The control method as claimed in claim 7, wherein the processor is a micro controller unit (MCU).

9. The control method as claimed in claim 1, wherein at the time that the second sensor detects the north pole, the second sensor outputs the third signal, and the third signal is maintained at high level for the predetermined duration.

10. A motor comprising
    a rotor having a plurality of north poles and south poles;
    a stator;
    a first sensor disposed on the stator;
    a second sensor disposed on the stator in such a manner that the first and second sensors never simultaneously detect boundaries between the north and south poles during rotation of the rotor; and a processor receiving signals from the first and second sensors and generating an enable signal according to the received signal so that the motor is shut off when a first signal and a second signal are alternately output by the first sensor, and a third signal or a fourth signal is continuously sent out by the second sensor and longer than a predetermined duration.

11. The motor as claimed in claim 10, wherein the first sensor and the second sensor are magnetic field sensors.

12. The motor as claimed in claim 11, wherein the magnetic field sensor is a shunt, a current transformer, or a Hall sensor.

13. The motor as claimed in claim 11, wherein the magnetic field sensor is a magnetic resistor.

14. The motor as claimed in claim 10, wherein the processor is a micro controller unit (MCU).

15. A motor comprising:
a rotor having a plurality of north poles and south poles;
a stator;
a first sensor disposed on the stator and outputting a first signal when the first sensor detects any one of the north poles during the rotation of the rotor and a second signal when the first sensor detects any one of the south poles; and
a second sensor disposed on the stator in such a manner that the first and second sensors never simultaneously detect boundaries between the north and south poles during rotation of the rotor and outputting a third signal when the second sensor detects any one of the north poles during rotation of the rotor, and a fourth signal when the second sensor detects any one of the south poles, wherein the motor is shut off when the first signal and the second signal are alternately output by the first sensor, and the third signal or the fourth signal is continuously sent out longer than a predetermined duration.

16. The motor as claimed in claim 15, wherein the first sensor and the second sensor are magnetic field sensors which are a shunt, a current transformer, a Hall sensor or a magnetic resistor.

* * * * *